(12) United States Patent
Mertens et al.

(10) Patent No.: US 11,582,061 B2
(45) Date of Patent: Feb. 14, 2023

(54) BUS COUPLER FOR A NETWORK AND METHOD FOR OPERATING A BUS COUPLER

(71) Applicant: TURCK Holding GmbH, Halver (DE)

(72) Inventors: Marcel Mertens, Duisburg (DE); Ludger Knaak, Huerth (DE)

(73) Assignee: TURCK HOLDING GMBH, Halver (DE)

( * ) Notice: Subject to any disclaimer, the term of this patent is extended or adjusted under 35 U.S.C. 154(b) by 0 days.

(21) Appl. No.: 17/234,819

(22) Filed: Apr. 20, 2021

(65) Prior Publication Data
US 2021/0328827 A1    Oct. 21, 2021

(30) Foreign Application Priority Data

Apr. 21, 2020  (DE) .................. 102020110753.6

(51) Int. Cl.
*H04L 12/40* (2006.01)
*H04L 12/42* (2006.01)
*H04L 12/28* (2006.01)

(52) U.S. Cl.
CPC .... *H04L 12/40013* (2013.01); *H04L 12/2885* (2013.01); *H04L 12/40091* (2013.01); *H04L 12/42* (2013.01); *H04L 2012/421* (2013.01)

(58) Field of Classification Search
CPC ......... H04L 12/40013; H04L 12/40091; H04L 12/2885; H04L 12/42; H04L 2012/421
See application file for complete search history.

(56) References Cited

U.S. PATENT DOCUMENTS

| 5,878,236 | A  | * | 3/1999  | Kleineberg | ........... G06F 13/362 |
|---|---|---|---|---|---|
|  |  |  |  |  | 710/305 |
| 8,291,142 | B2 | * | 10/2012 | Kuschke | ................. H04L 41/00 |
|  |  |  |  |  | 710/306 |
| 9,130,773 | B2 | * | 9/2015  | Buttner | ............... H04L 61/5038 |
| 10,496,588 | B2 | * | 12/2019 | Buesching | .......... G06F 13/4265 |
| 10,581,633 | B2 | * | 3/2020  | Pollmann | .......... H04L 12/40189 |
| 2010/0014527 | A1 | * | 1/2010  | Sakauchi | ................ H04L 12/42 |
|  |  |  |  |  | 370/400 |
| 2010/0034204 | A1 | * | 2/2010  | Sakauchi | .............. H04L 12/437 |
|  |  |  |  |  | 370/400 |
| 2011/0060855 | A1 | * | 3/2011  | Kuschke | ............. H04L 12/4625 |
|  |  |  |  |  | 710/316 |

FOREIGN PATENT DOCUMENTS

| CA | 2923000 | C | * | 4/2018 | ............. G08B 25/04 |
|---|---|---|---|---|---|
| CN | 105790843 | B |  | 4/2018 |  |

* cited by examiner

*Primary Examiner* — Rasheed Gidado
(74) *Attorney, Agent, or Firm* — Leydig, Voit & Mayer, Ltd.

(57) ABSTRACT

A bus coupler for a network, in particular for an optical ring network, includes: a bus participant interface for data connection to at least one bus participant device; a bus receiving interface for receiving bus input data via a bus line; a bus transmitting interface for transmitting bus output data via the bus line; and a control unit for generating bus output data based on participant input data received via the bus participant interface, the bus transmission data including bus control data, and to transfer the bus output data to a further bus coupler by the bus transmitting interface. The control unit specifies a control signal based on the bus input data received by the bus receiving interface and performs a relaying of the bus input data to the further bus coupler based on the specified control signal.

17 Claims, 3 Drawing Sheets

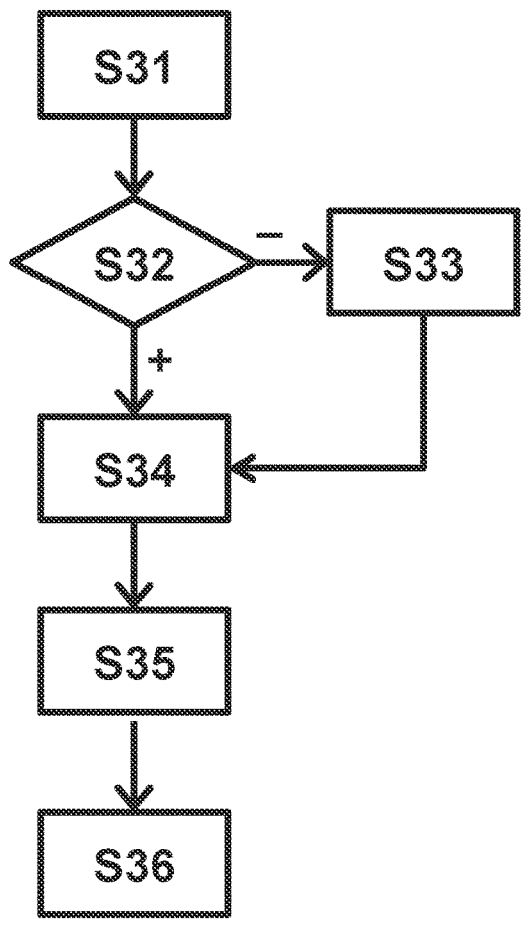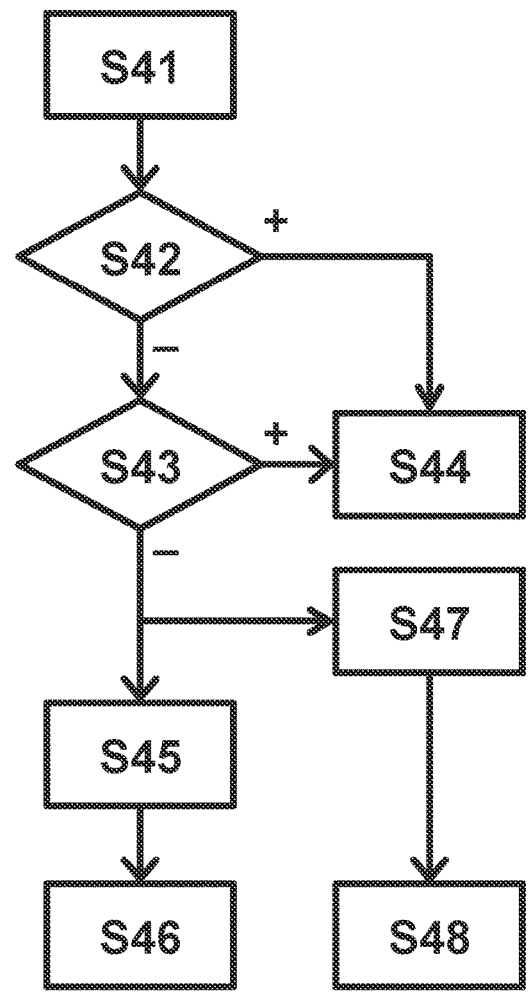
Fig. 5
Fig. 6

BUS COUPLER FOR A NETWORK AND METHOD FOR OPERATING A BUS COUPLER

CROSS-REFERENCE TO PRIOR APPLICATION

Priority is claimed to German Patent Application No. DE 10 2020 110 753.6, filed on Apr. 21, 2020, the entire disclosure of which is hereby incorporated by reference herein.

FIELD

The invention relates to a bus coupler for a network, in particular for an optical ring network, as well as a method for operating a bus coupler for a network, in particular an optical ring network.

BACKGROUND

From automation and control engineering, various network types are known which serve, for example, to actuate different devices from a specified unit or to retrieve data captured by sensor devices.

In the case of known networks, for instance for communication by means of PROFIBUS, couplers connected to a network have interfaces to further devices. The couplers are furthermore connected to each other and in the process can form a closed ring. From the connected devices, data packets, also called "telegrams", are transferred to a coupler and transmitted from that to a further coupler. A further device connected to the further coupler can then receive the telegram.

For instance, it is known from CN 105790843 B to use an address table which is formed of received and evaluated telegrams. From this the coupler recognizes whether an incoming telegram has already been relayed before. However, a relaying can be effected here only after receipt of a larger number of bytes per telegram. An immediate relaying of every byte received is therefore not possible.

Furthermore, a system can be formed such that the entire ring is practically never utilized even in the case of a ring configuration. In particular, a ring is constructed of optical connections, but it is in practice operated like a line structure. The last connection, closing the ring, is only used when another line fails. A switching is effected via a master device in the ring network. As data are never transmitted along a closed ring here, no addressing is required in this solution. Long switching times result as errors are to be recognized only when in the master device.

SUMMARY

In an embodiment, the present invention provides a bus coupler for a network, in particular for an optical ring network, comprising: a bus participant interface for data connection to at least one bus participant device; a bus receiving interface configured to receive bus input data via a bus line; a bus transmitting interface configured to transmit bus output data via the bus line; and a control unit configured to generate bus output data based on participant input data received via the bus participant interface, the bus transmission data including bus control data, and to transfer the bus output data to a further bus coupler by the bus transmitting interface, wherein the control unit is configured to specify a control signal based on the bus input data received by the bus receiving interface and to perform a relaying of the bus input data to the further bus coupler based on the specified control signal.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 5 shows a third embodiment example of the method for operating the bus coupler; and FIG. 6 shows a fourth embodiment example of the method for operating the bus coupler.

DETAILED DESCRIPTION

Figure 1:
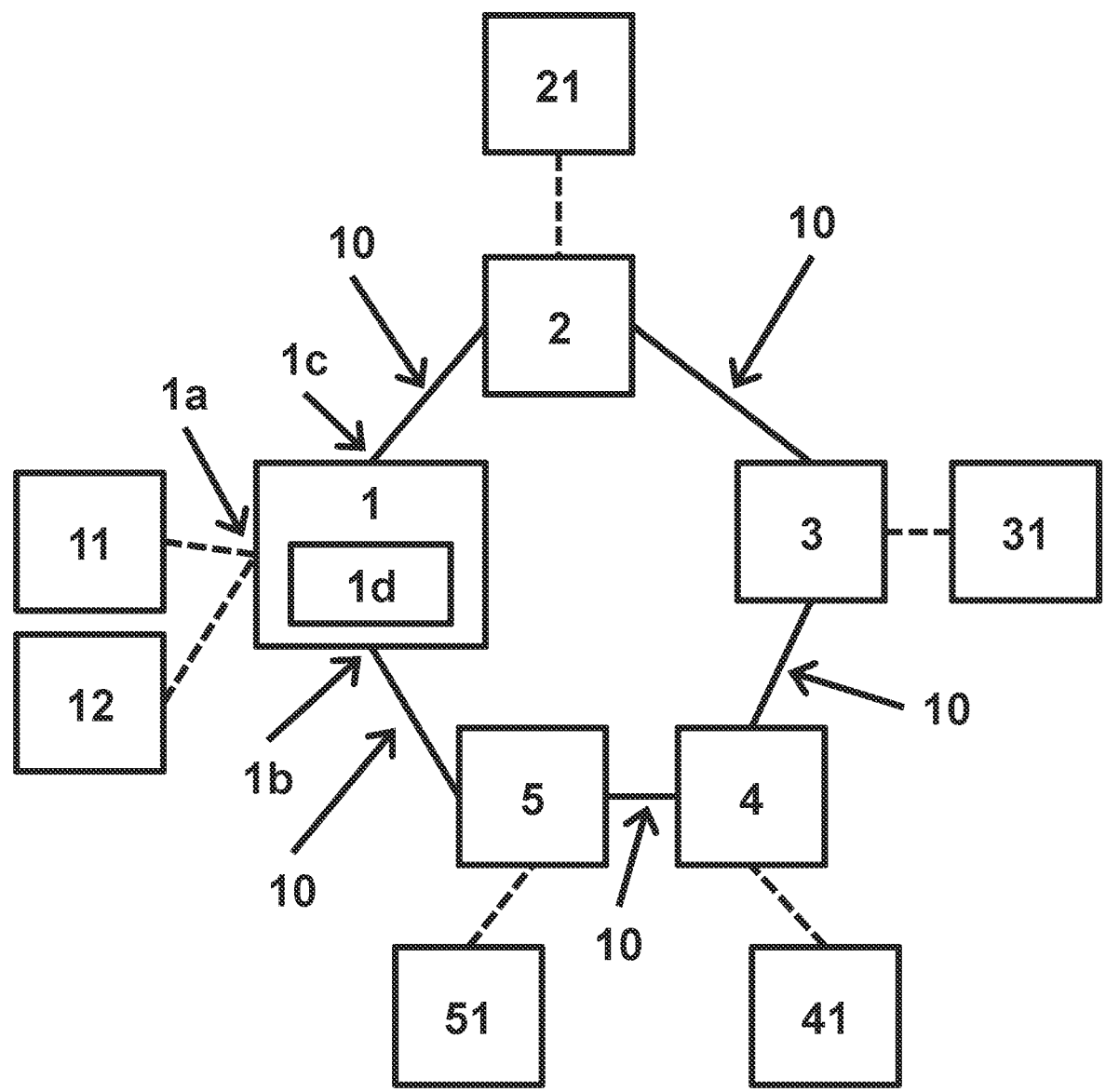
FIG. 1 shows an embodiment example of a network with the bus coupler.

In an embodiment, the present invention provides a bus coupler for a network, in particular an optical ring network, and a method for operating it, which make a particularly efficient utilization of a ring configuration used as a bus possible.

The bus coupler for a network, in particular for an optical ring network, includes a bus participant interface for data connection to at least one bus participant device, a bus receiving interface for receiving bus input data via a bus line and a bus transmitting interface for transmitting bus output data via the bus line. It furthermore includes a control unit which is equipped to generate bus output data on the basis of participant input data received via the bus participant interface, wherein the bus transmission data include bus control data, and to transfer them to a further bus coupler by means of the bus transmitting interface. The control unit is furthermore equipped to specify a control signal on the basis of the bus input data received by means of the bus receiving interface and to perform a relaying of the bus input data to the further bus coupler on the basis of the specified control signal.

Advantageously, the transferring and relaying of data within the network can thereby be controlled particularly efficiently.

In the invention the bus coupler, in particular, does not simply relay data, in particular a so-called telegram, received by the bus participant device to further participant devices via the bus line. Instead, the participant input data are supplemented by the bus control data which control the following relaying through the bus line. The bus output data transferred by the bus coupler to the next bus coupler are thus generated based on the participant input data and furthermore include the bus control data. In particular, the control data are formed such that the bus coupler can recognize when it is receiving the telegram again, this time by means of the bus receiving interface, because it has passed through the network.

An advantage of the invention is the direct relaying of the data in a network configured in particular as a ring without evaluation of the data, in particular with respect to a sender and/or recipient. The decision to relay a specified telegram or to remove it from the ring can in particular already be made after the receipt and evaluation of the first byte. In the process it is furthermore ensured that data are not relayed in the ring if this is no longer necessary. In this way, the ring is not jammed up with superfluous data, in particular even after the failure of a device which is responsible for terminating the relaying in known systems.

In particular, it is provided that a telegram is transmitted in the network such that the bus control data are upstream of the data of the telegram, in particular as the participant receiving data. The transferred data are then structured for instance such that the bus control data are transmitted before the participant receiving data to be transferred are transmitted. For example, the bus control data can have a length of one byte and be formed in particular as a "control byte", with the result that they can be inserted into the gap that is typically provided of 1.5 bytes between several telegrams within the network. The bus control data are arranged within the bus transmission data in particular such that they are transmitted and received by another bus coupler before the data of a telegram to be transferred. In this way, it is ensured that even in the case of a byte-by-byte transfer the bus couplers of the network can already decide on the basis of the bus control data received first whether these data are to be relayed to the next bus coupler or not.

The bus control data can have another length, for instance several bytes, for example in order to implement a system with a multi-level control of the relaying.

In the network, the bus line is formed by at least two bus couplers coupled to each other, wherein the bus couplers are data-connected to each other in particular in series. The connections between individual bus couplers are called segments of the bus line.

The bus couplers are equipped to receive signals from connected bus participant devices and, via the bus line to which the bus couplers are connected, to transmit a so-called telegram, as well as to receive telegrams via the bus line and to output them to the bus participant devices which are in turn connected to the bus couplers. They are furthermore equipped to relay a telegram received via the bus line from another bus coupler to a further bus coupler, with the result that the telegram passes through the network from one bus coupler to the next until it is no longer relayed by a bus coupler and is thereby deleted from the network. The interruption of the relaying or the deletion of a telegram from the network is effected in particular under predefined conditions; the relaying of the telegram along the bus line from one bus coupler to the next is thereby interrupted in particular.

In one embodiment the control unit is furthermore equipped to transfer the bus input data received by means of the bus receiving interface to the further bus coupler one byte at a time depending on the control signal.

This advantageously allows a particularly quick and efficient relaying of a telegram through the network. The relaying of data, in particular of a telegram, in the network by the bus coupler is effected in particular "byte-by-byte", i.e. the bus coupler does not only transmit the telegram on after it has received and optionally analysed a larger data packet or the entire telegram. Rather, the individual bytes of the telegram are relayed to the next bus coupler as directly as possible.

If the bus couplers are coupled in a ring configuration, the output of a first bus coupler is coupled to the input of a second bus coupler; furthermore, the output of the second bus coupler is coupled to the input of the first bus coupler. If the network includes further bus couplers, these are connected for example between the first and second bus couplers, for example by coupling the output of the first bus coupler to the input of the further bus coupler and the output of the further bus coupler to the input of the second bus coupler; furthermore, a further bus coupler can be connected between the output of the second bus coupler and the input of the first bus coupler. This means that the bus line has a ring structure, in particular a closed ring.

A telegram is transferred in the network in ring configuration from a first bus coupler to the next and on from this until it reaches the first bus coupler again; without a break condition, the telegram is thus constantly transferred further along the ring structure of the bus line. Over time, telegrams which take up the available band width and the capacity of the connected devices can thus build up in the network.

A break condition can be defined for example in that a bus coupler no longer relays a telegram if it has already relayed it once. For this, however, the bus coupler has to recognize the telegram. However, if a bus coupler is to relay received telegrams byte-by-byte, then the bus coupler cannot recognize a telegram in its entirety before the relaying. The bus coupler of the invention utilizes the bus control data to control the relaying.

In a further embodiment the bus line includes an optical waveguide. In particular, the bus receiving interface and the bus transmitting interface of the bus coupler are suitable for optical communication. Data are thereby advantageously transferred in the network particularly quickly and in a broadband manner, in particular between several bus couplers connected to each other via the bus line.

In particular, optical interfaces of the bus coupler are suitable for data connection by means of an optical fibre. In particular, one transmitting and/or one receiving unit is provided per interface. In an optical ring network at least two devices are connected with their optical interfaces in a ring configuration, i.e. the optical output of the first device is connected to the input of the second device, furthermore the output of the second device is connected to the input of the first device. Where there are more than two devices, the ring formed by the devices is correspondingly widened.

The bus participant interface of the bus coupler provides in particular a data input, via which the bus coupler can receive data from at least one connected bus participant device, and a data output, via which the bus coupler can transfer data to the at least one connected participant device.

In a development the bus participant interface is equipped to receive the participant input data from the bus participant device by means of a wired data transfer. A particularly simple connection to different participants is thereby advantageously produced, the data of which can be transferred via the network.

In particular in the case of a bus system operated via an optical ring network, the bus participant interface of the bus coupler can correspond to a so-called "copper side" in the communication of the bus coupler, wherein the data connection between the bus coupler and the at least one connected bus participant device is effected via a wired data line. Alternatively or additionally, other types of data connection can be used between the participant device and the bus coupler, in particular optical data carriers or waveguides or radio-based transfer methods.

In the case of a ring network the telegram, if it is not to be routed through the ring network again and again, must be removed from the ring at a specified time, i.e. one of the couplers in the ring network must interrupt the chain of the relaying. The removal can be achieved in that the coupler which originally transmitted the telegram recognizes the completion of a lap through the ring network, i.e. it recognizes a telegram originally transmitted by it, and removes it, optionally under additional conditions, for instance if a receipt of the telegram is confirmed by a connected target device. If the device originally transmitting a telegram fails after the transmission, the telegram cannot be removed from the ring in this way.

In particular if a byte-by-byte transfer is taking place, for instance in order to transfer a telegram in the network, the devices in the network, in particular a ring network, usually cannot recognize whether they have transferred the same telegram before.

In one embodiment the control data include an addressing allocated to the bus coupler.

In contrast to known systems it is thereby advantageously achieved that the bus coupler is recognizable within the ring network on the basis of an addressing. This is not usually the case, as segment couplers in the ring network are typically only utilized to transfer data and are not addressable or recognizable individually. This means in particular that the bus coupler is addressable and/or recognizable on the basis of the addressing allocated to it, while it is in particular not visible to the bus participant devices connected to the ring network.

In a further embodiment the control unit is furthermore equipped to specify the control signal such that the relaying of received bus input data to the further bus coupler is performed if the bus receiving data do not include an addressing allocated to the bus coupler. Conversely, in particular the relaying is not performed if the addressing allocated to the bus coupler is included in the bus receiving data.

The relaying is thereby advantageously particularly simply controlled and optionally limited. A telegram is, in particular, relayed by a bus coupler only when the latter establishes that it did not transmit the telegram into the network itself. A telegram is thus deleted from the network if it has already passed through a ring configuration. For this, in particular, no bus transmission data are generated and transferred for relaying the bus receiving data if the bus receiving data include the addressing allocated to the respective bus coupler itself.

The control unit generates the bus transmission data in particular on the basis of the participant input data, such that the bus coupler is recognizable as the original sender. Normally, no addressing of the bus couplers is provided, as these only carry out the relaying of the telegrams in the network and are not themselves addressees of the relayed data. In this embodiment of the method the telegram routed into the network by the bus coupler is, however, marked in such a way that the bus coupler recognizes the telegram again when it has passed through the network. The bus coupler can then interrupt the relaying of the telegram, in particular after it has passed through the network completely once.

For example the address, usually uniquely defined in the network, of a connected bus participant device can be utilized as addressing of the bus coupler. The bus coupler can for example be assigned the address of that bus participant device from which it receives the first participant input data for relaying the first telegram into the network. This addressing can then also be utilized for further telegrams which are generated based on participant input data of further bus participant devices, as the addressing allocated to the bus coupler is utilized merely for communication with the further bus couplers and conflicts in the addressing are ruled out.

During the relaying of data which the bus coupler receives as bus input data via the bus receiving interface, bus output data for output via the bus transmitting interface are in turn generated and transferred to the next bus coupler. The received bus input data can in particular be relayed directly or new bus output data can be generated, wherein in particular bus control data can be newly generated or modified. For example, control data can be added which were not previously included in the bus input data. Furthermore, bus control data already present can be altered, for instance in order to change the value of a counter or an item of switch information, for example an item of deletion switch information, or to set a deletion bit in a predefined manner.

In a development the control unit is furthermore equipped to generate modified bus output data for the relaying of the received bus receiving data. In particular bus control data included in the bus receiving data are modified in the process.

Advantageously, already obtained and possibly relayed data can thereby be identified by means of the bus control data. For example, the bus control data can include a counter which is changed when the telegram is relayed by the bus coupler, in order thus to establish how often the telegram has already been relayed or how often it has passed a specified bus coupler in the network. In particular, the relaying can be aborted after a specified status of the counter has been reached. A continual circulation in the ring network of data that are not needed can thereby be avoided, for instance if other mechanisms malfunction, for instance in the case of the failure of one of the participating devices.

In one embodiment the bus control data furthermore include an item of deletion switch information, which is formed in particular as a deletion bit, wherein in particular the control unit is equipped to specify the control signal depending on the deletion switch information. An item of deletion switch information is formed such that by comparing the deletion switch information with a specified value it can be directly decided whether the data are to be relayed or not.

It is thereby advantageously particularly simply indicated whether the data are to be transferred further in the network or removed therefrom.

It can be provided that one of the bus couplers of the network is formed as a master coupler. The latter sets, for example, the deletion bit when it relays a telegram. Through a deletion bit, by setting or not setting, it is possible to distinguish particularly simply between two states, in which the data are to be relayed or not. In particular, such a deletion bit can be set when the master coupler relays data, with the result that these are premarked, when they reach the master coupler again, such that they are not relayed once again.

In a further embodiment a data connection between bus participant devices can be implemented by means of a "Process Field Bus", PROFIBUS DB, via the network or one or more via the bus couplers connected to each other in the network. A particularly simple and widely used standard is thereby advantageously utilized for the communication of the connected bus participant devices. In further embodiments, other standards can be used.

In particular, the relaying of data or telegrams in the network is effected between the bus couplers without affecting the protocol used for the communication between bus participant devices. However, further embodiments of the invention can provide that the control of the relaying in the bus or by means of the bus coupler is integrated into the protocol, for example by an addressing of the bus couplers included in the protocol.

In the method for operating a bus coupler for a network, in particular for an optical ring network, participant input data are received and, on the basis of the received participant input data, bus transmission data are generated, wherein the bus transmission data include bus control data. Furthermore, if bus input data are received, a control signal is specified on the basis of the received bus input data and a relaying of the bus input data in the network is performed on the basis of the specified control signal.

The method is, in particular, formed to operate the bus coupler. It therefore has the same advantages as the bus coupler according to the invention.

The invention furthermore relates to a network with at least two bus couplers according to the above description.

The invention furthermore relates to a method for operating a network, in particular an optical ring network. The network includes at least two bus couplers according to the above description which are operated by means of the above-described method.

An embodiment example of a network with the bus coupler is explained with reference to FIG. 1.

In the network, bus couplers 1, 2, 3, 4, 5 are coupled to each other via a bus line 10 in a ring configuration, i.e. they are coupled in series such that a closed ring is formed. The parts of the bus line 10 which connect the individual bus couplers 1, 2, 3, 4, 5 to each other are called "bus segments". In the embodiment example, the bus line 10 is formed by means of optical waveguides, in particular by means of glass fibre lines.

In the embodiment example, all bus couplers 1, 2, 3, 4, 5 are structured identically in principle, but the structure is shown in detail for only a first bus coupler 1. A bus participant interface 1a is equipped to produce a data connection, via which data can be received and transmitted, by means of a wired, "copper-side" communication with connected bus participant devices 11, 12. A bus receiving interface 1b and a bus transmitting interface 1c of the bus coupler 1 are equipped to receive data from or transfer data to connected further bus couplers 2, 5. In the embodiment example, this communication between the bus couplers 1, 2, 3, 4, 5 is effected via the optical bus line 10.

The bus coupler 1 furthermore includes a control unit 1d, which in particular controls the operation of the bus coupler 1. The control is effected by means of control signals, which are generated by the control unit 1d, in particular for actuating the bus participant interface 1a as well as the bus receiving interface 1b and the bus transmitting interface 1c.

Via the bus line 10 the bus couplers 1, 2, 3, 4, 5 are coupled to each other in series such that the bus transmitting interface 1c of the first bus coupler is coupled to a corresponding bus receiving interface of the second bus coupler 2, with the result that data can be transmitted from the first bus coupler 1 to the second 2 via this segment of the bus line 10. The data can then be transferred from the second bus coupler 2 to the third bus coupler 3 and so on, until they are transferred by the last bus coupler 5 of the network shown to the first bus coupler 1 again and received by the latter via the bus receiving interface 1b.

In the network shown in FIG. 1, further bus participant devices 21, 31, 41, 51 are furthermore provided, which are connected to the further bus couplers 2, 3, 4, 5.

With the aid of FIGS. 1 and 2, it is summarized below how data can be transferred in the embodiment example of a network shown in FIG. 1. The embodiment example of a network with the bus coupler 1 explained above with reference to FIG. 1 is taken as the starting point.

A bus participant device 11 transmits participant input data to the bus coupler 1 via the bus participant interface 1a formed as "copper side". This is effected via a cable connection, in particular a metal cable. In further embodiment examples, the data transfer can be effected in another way. The participant input data include for instance data of a measured value which is captured by the bus participant device 11, or data for requesting further data from another bus participant device 12, 21, 31, 41, 51 or for actuating another bus participant device 12, 21, 31, 41, 51.

The control unit 1d of the bus coupler 1 generates bus output data which, in the embodiment example, include the participant input data, which are to be transferred as a so-called "telegram" via the bus or via the bus line 10, in particular to one of the further bus participant devices 21, 31, 41, 51. Furthermore, the bus output data include bus control data for controlling the transfer in the network and through the bus couplers 1, 2, 3, 4, 5, wherein in the embodiment example the bus control data include a "control byte", which is explained in more detail below with reference to FIG. 2. This control byte is set directly in front of the telegram to be transferred. Between the telegrams which are transferred in the ring network, a gap of 1.5 bytes is usually provided and in the embodiment example the control byte is inserted into this gap, or this gap is correspondingly made smaller by the control byte.

In the embodiment example, the relaying of the data is effected one byte at a time, i.e. the bus coupler 1 directly relays each byte received. In further embodiment examples, the relaying can be effected in another way, for instance in packets of a larger data volume.

Figures 2, 3, 4:
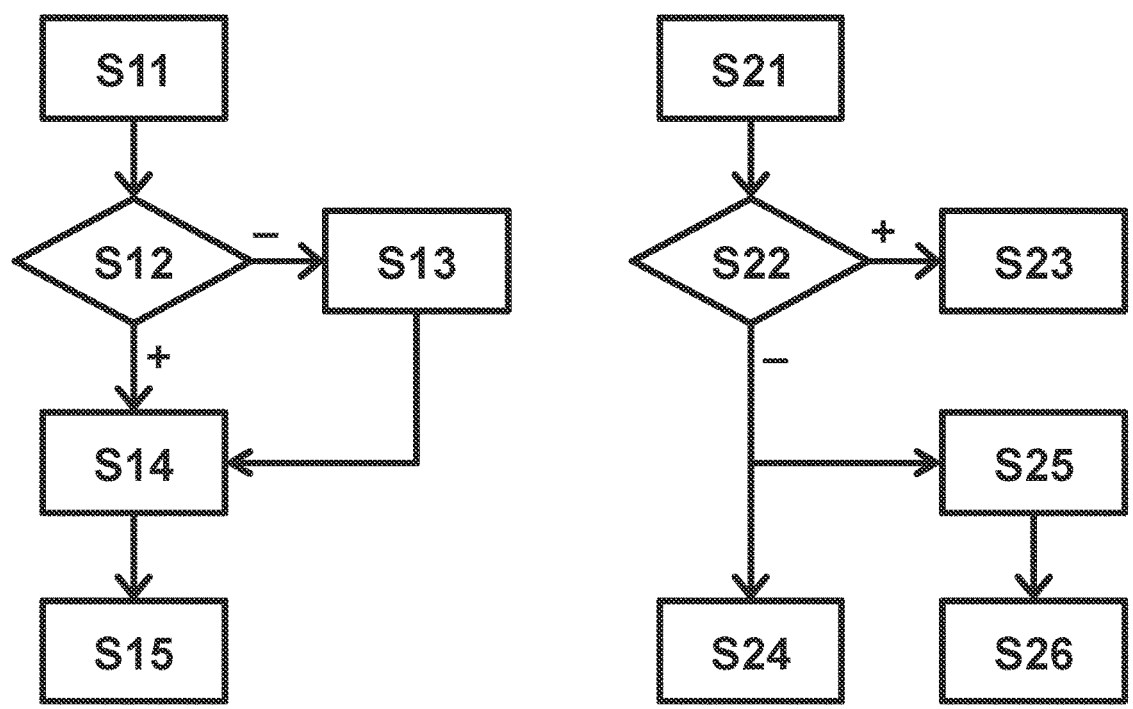
FIG. 2 shows an embodiment example of control data for operating the bus coupler.
FIG. 3 shows a first embodiment example of the method for operating the bus coupler.
FIG. 4 shows a second embodiment example of the method for operating the bus coupler.

The control byte 60 is structured as shown in FIG. 2 in the embodiment example: it comprises 8 bits, of which 7 bits are used to record an addressing allocated to the bus coupler 1, which is represented in FIG. 2 by the labelling of the bits as "ADR_0" to "ADR_6". Furthermore, a "TRB" is provided, which acts as deletion switch information. TRB stands for "telegram remove bit" and this bit is set depending on whether the telegram following the control byte 60 is to be relayed in the network or not. In particular, after evaluating the TRB the bus coupler 1 decides directly whether the telegram is relayed.

The addressing allocated to the bus coupler 1 is specified in the method on the basis of data which the bus coupler 1 receives from the connected bus participant devices 11, 12. The data received by the bus participant devices 11, 12 include in each case information about an addressing of these bus participant devices 11, 12, which is assigned to them in the network as a unique identification. In the embodiment example the bus coupler 1 adopts the addressing of that bus participant device 11, 12 from which it obtains the first data, for itself.

The addressing of the bus coupler 1 is only used for the purposes of relaying data via the bus line 10, in particular as "ring address" of the bus coupler 1, with the result that it remains "invisible" to the bus participant devices 11, 12, 21, 31, 41, 51 connected in the network, with the result that in particular the addressing in the network of the bus participant devices 11, 12, 21, 31, 41, 51 is to be uniquely allocated among them. During the specification of the addressing allocated to the bus coupler 1 it is ensured that it can be stored in the 7 bits of the control byte 60 in the embodiment example; optionally the addressing in further examples is specified in another way such that it can be stored in the control byte 60. The addressing is retained by the bus coupler 1 in particular permanently and/or until a voltage reset.

Furthermore, the control unit 1d controls the bus coupler 1 such that data received by the preceding bus coupler 5 can be relayed. Bus input data are received by means of the bus receiving interface 1b. On the basis of the bus input data, the bus control data included in them are captured and it is specified whether the conditions for relaying the data are met. In particular, the control byte is analysed and checked for this purpose. If the conditions for a relaying are met or if no deletion conditions are met, bus output data are generated, wherein in the simplest case the received bus input data are relayed unchanged and transmitted to the next bus coupler 2 by the bus transmitting interface 1c. Optionally, the bus control data or the control byte are modified.

In the embodiment example, it is provided as deletion condition that a telegram is not relayed if the addressing included in the received control byte matches the addressing allocated to the bus coupler 1 itself. It is thus recognized if the bus coupler 1 has itself relayed the telegram into the network, and in this case the telegram is no longer relayed.

A first embodiment example of the method for operating the bus coupler is explained with reference to FIG. 3. The above embodiments are taken as the starting point and identical or similar elements are not described again in detail.

In a step S11 the bus coupler 1 receives participant input data from one of the connected bus participant devices 11, 12. The participant input data include a so-called "telegram" with data which are to be transferred via the bus line 10 to one of the other bus participant devices 11, 12, 21, 31, 41, 51 connected to the network. In the embodiment example this transfer is effected by means of a PROFIBUS DB protocol.

In a step S12 the control unit 1d checks whether the bus coupler 1 already has a ring address, i.e. whether an addressing is allocated to the bus coupler 1. If this is not the case, in a step S13 an addressing is specified on the basis of the received participant input data: the participant input data include information about a network address of the bus participant device 11, 12 from which the participant input data originate. This means in particular that the bus coupler 1 is assigned an addressing which corresponds to the network address of the first bus participant device 11, 12 from which it receives participant input data.

In a step S14 bus control data are generated which, in the embodiment example, consist of a control byte. The addressing allocated to the bus coupler 1 is stored in the control byte. The bus control data are set in front of the telegram. This means that the bus output data include the control byte and the telegram to be transferred.

In a further step S15 the thus-generated bus output data are transferred via the bus transmitting interface 1c to the next bus coupler 2.

A second embodiment example of the method for operating the bus coupler is explained with reference to FIG. 4. The above embodiments are taken as the starting point and identical or similar elements are not described again in detail.

In a step S21 the bus coupler 1 receives bus input data via the bus receiving interface 1b. The bus input data are formed in particular corresponding to the bus output data transmitted above in step S15, i.e. they include bus control data, in particular a control byte, and a telegram.

In a step S22 it is checked whether the control data include an addressing which corresponds to the ring address particular to the bus coupler 1.

If this is the case, in a step S23 no relaying is performed. This means that, if it is established that a telegram has completed an entire circuit through the ring network, the telegram is deleted from the network or is no longer relayed.

If, on the other hand, no addressing corresponding to the particular ring address is established, in a step S24 the telegram is relayed. In this embodiment example, for this purpose, the relaying is effected "byte-by-byte" and unchanged by transmission via the bus transmitting interface 1c to the next bus coupler 2.

Furthermore the telegram is transferred to the connected bus participant devices 11, 12. For this purpose, in a step S25 the bus control data are removed and the telegram is transmitted in a step S26 via the bus participant interface 1a to the bus participant devices 11, 12.

A third embodiment example of the method for operating the bus coupler is explained with reference to FIG. 5. The above embodiments are taken as the starting point and identical or similar elements are not described again in detail.

The third embodiment example shown in FIG. 5 substantially corresponds to the first embodiment example of FIG. 3. However, the bus coupler 1 here takes on an additional function as so-called "ring master", i.e. as a device for superordinate control of the relaying of telegrams in the network. In such a system a bus coupler 1 which is configured to implement the method as in FIG. 3 can be defined as a "ring slave".

In a step S31 participant input data are received via the bus participant interface 1a. In a step S32 it is checked whether an addressing is already allocated to the bus coupler 1 and, if need be, the allocation is effected as described above in a step S33. In a step S34 bus output data are generated as described above, wherein a control byte is set in front of the telegram to be transferred.

Unlike in the above-described first embodiment example of the method, the TRB (telegram remove bit) is now set in the control byte in a step S35. This setting of the TRB corresponds, in this embodiment example, to the information that the telegram is no longer to be relayed in the next evaluation of the TRB, thus that the telegram is to be removed from the ring network.

In a step S36, finally, the bus output data are transferred to the next bus coupler 2 via the bus transmitting interface 1c via the bus line 10.

A fourth embodiment example of the method for operating the bus coupler is explained with reference to FIG. 6. The above embodiments are taken as the starting point and identical or similar elements are not described again in detail.

The fourth embodiment example shown in FIG. 6 substantially corresponds to the second embodiment example of FIG. 4. However, here the bus coupler 1 also takes on the function of "ring master" and performs a superordinate control of the relaying of telegrams in the network. In such a system a bus coupler 1 which is configured to implement the method as in FIG. 4 can be defined as a "ring slave".

In a step S41 bus input data are received via the bus receiving interface 1b. In a step S42 it is checked whether the items of information about an addressing included in the bus input data correspond to the ring address particular to the bus coupler 1. If this is the case, the telegram is not relayed in a step S44.

Furthermore, in a step S43 it is checked whether the TRB is set, i.e. whether the ring master has already transmitted or relayed the telegram beforehand. If the TRB is set, the telegram is likewise not relayed in step S44.

If, on the other hand, the TRB is not set, it is now set in a step S45, before the relaying is effected via the bus transmitting interface 1c by means of bus output data in a step S46.

Furthermore, if the TRB is not set, in a step S47 the bus control data are removed and an output of the telegram to the connected bus participant devices 11, 12 via the bus participant interface 1a is effected in a step S48.

In the case of the above-described use, the TRB can be regarded as a counter which distinguishes between 0 and 1. After achieving a full circuit, the telegram is deleted from the ring network. In further embodiment examples, it can furthermore be provided that the bus control data include a counter formed in a different way, by which for example a larger number of passes or individual relaying processes are counted; for this purpose, the counter is increased when it is relayed by a suitably configured bus coupler 1, 2, 3, 4, 5. After a particular threshold has been reached, the relaying is interrupted. This can also serve as a safeguard against unnecessary relaying being carried out, for instance because one of the participating devices fails.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 1 bus coupler
1a bus participant interface
1b bus receiving interface
1c bus transmitting interface
1d control unit
2, 3, 4, 5 further bus couplers
10 bus line
11, 12 bus participant device
21, 31, 41, 51 further bus participant device
60 bus control data; control byte
S11, S12, S13, S14, S15 step
S21, S22, S23, S24, S25, S26 step
S31, S32, S33, S34, S35, S36 step
S41, S42, S43, S44, S45, S46, S47, S48 step

What is claimed is:

1. A bus coupler for a network, in particular for an optical ring network, comprising:
   a bus participant interface for data connection to at least one bus participant device;
   a bus receiving interface configured to receive bus input data via a bus line;
   a bus transmitting interface configured to transmit bus output data via the bus line; and
   a control unit configured to generate bus output data based on participant input data received via the bus participant interface, the bus output data including bus control data, and to transfer the bus output data to a further bus coupler by the bus transmitting interface,
   wherein the control unit is configured to specify a control signal based on the bus input data received by the bus receiving interface and to perform a relaying of the bus input data to the further bus coupler based on the specified control signal.

2. The bus coupler according to claim 1, wherein the control unit is configured to transfer the bus input data received by the bus receiving interface to the further bus coupler one byte at a time depending on the control signal.

3. The bus coupler according to claim 1, wherein the bus line includes an optical waveguide.

4. The bus coupler according to claim 1, wherein the bus participant interface is configured to receive the participant input data from the bus participant device by a wired data transfer.

5. The bus coupler according to claim 1, wherein the control data include an addressing allocated to the bus coupler.

6. The bus coupler according to claim 5, wherein the control unit configured to specify the control signal such that the relaying of received bus input data to the further bus coupler is performed if the bus receiving data do not include an addressing allocated to the bus coupler.

7. The bus coupler according to claim 1, wherein the control unit is configured to generate modified bus output data for the relaying of received bus receiving data, and
   wherein bus control data included in the bus receiving data is modified.

8. The bus coupler according to claim 1, wherein the bus control data include an item of deletion switch information comprising a deletion bit, and
   wherein the control unit is configured to specify the control signal depending on the deletion switch information.

9. The bus coupler according to claim 1, wherein a data connection between bus participant devices comprises a Process Field Bus (PROFIBUS DB) via the network.

10. A method for operating a bus coupler for a network, in particular for an optical ring network, comprising:
    receiving participant input data;
    generating bus transmission data based on the received participant input data, the bus transmission data including bus control data; and
    when bus input data are received, specifying a control signal based on the received bus input data and performing a relaying of the bus input data in the network based on the specified control signal, wherein the bus coupler comprises:
a bus participant interface for data connection to at least one bus participant device;
a bus receiving interface configured to receive the bus input data via a bus line;
a bus transmitting interface configured to transmit bus output data via the bus line; and
a control unit configured to generate bus output data based on participant input data received via the bus participant interface, the bus output data including bus control data, and to transfer the bus output data to a further bus coupler by the bus transmitting interface,
wherein the control unit is configured to specify a control signal based on the bus input data received by the bus receiving interface and to perform a relaying of the bus input data to the further bus coupler based on the specified control signal.

11. A bus coupler for a network, in particular for an optical ring network, comprising:
a bus participant interface for data connection to at least one bus participant device;
a bus receiving interface configured to receive bus input data via a bus line;
a bus transmitting interface configured to transmit bus output data via the bus line; and
a control unit configured to generate bus output data based on participant input data received via the bus participant interface, the bus output data including bus control data, and to transfer the bus output data to a further bus coupler by the bus transmitting interface,
wherein the control unit is configured to specify a control signal based on the bus input data received by the bus receiving interface and to perform a relaying of the bus input data to the further bus coupler based on the specified control signal,
wherein the control unit is configured to generate modified bus output data for the relaying of received bus receiving data,
wherein bus control data included in the bus receiving data is modified,
wherein the bus control data include an item of deletion switch information comprising a deletion bit, and
wherein the control unit is configured to specify the control signal depending on the deletion switch information.

12. The bus coupler according to claim 11, wherein the control unit is configured to transfer the bus input data received by the bus receiving interface to the further bus coupler one byte at a time depending on the control signal.

13. The bus coupler according to claim 11, wherein the bus line includes an optical waveguide.

14. The bus coupler according to claim 11, wherein the bus participant interface is configured to receive the participant input data from the bus participant device by a wired data transfer.

15. The bus coupler according to claim 11, wherein the control data include an addressing allocated to the bus coupler.

16. The bus coupler according to claim 15, wherein the control unit configured to specify the control signal such that the relaying of received bus input data to the further bus coupler is performed if the bus receiving data do not include an addressing allocated to the bus coupler.

17. The bus coupler according to claim 11, wherein a data connection between bus participant devices comprises a Process Field Bus (PROFIBUS DB) via the network.

* * * * *